(12) United States Patent
Velez

(10) Patent No.: US 6,860,629 B2
(45) Date of Patent: Mar. 1, 2005

(54) SOLID TRANSPARENT ACRYLIC LETTERS

(76) Inventor: Michael Velez, 1025 SE. 5th St., Hialeah, FL (US) 33010

( * ) Notice: Subject to any disclaimer, the term of this patent is extended or adjusted under 35 U.S.C. 154(b) by 0 days.

(21) Appl. No.: 10/222,152

(22) Filed: Aug. 16, 2002

(65) Prior Publication Data

US 2003/0067789 A1 Apr. 10, 2003

Related U.S. Application Data

(60) Provisional application No. 60/313,093, filed on Aug. 18, 2001.

(51) Int. Cl.[7] .............................................. G09F 13/00
(52) U.S. Cl. ..................... 362/559; 362/31; 362/812; 362/800
(58) Field of Search ................ 362/812, 800, 362/559, 240, 245, 301, 31; 40/549, 552, 564, 570, 573, 546, 563

(56) References Cited

U.S. PATENT DOCUMENTS

| | | | | |
|---|---|---|---|---|
| 3,404,475 A | * | 10/1968 | Coad ............................ | 40/552 |
| 4,028,828 A | * | 6/1977 | Chao et al. .................... | 40/552 |
| 4,450,640 A | * | 5/1984 | Shapiro et al. ................ | 40/596 |
| 5,786,665 A | * | 7/1998 | Ohtsuki et al. ............. | 313/512 |
| 6,478,450 B1 | * | 11/2002 | Grajcar ........................ | 362/249 |
| 6,481,130 B1 | * | 11/2002 | Wu .............................. | 40/546 |
| 6,705,033 B1 | * | 3/2004 | Greene et al. ................. | 40/546 |
| 6,712,486 B1 | * | 3/2004 | Popovich ..................... | 362/249 |
| 2003/0009924 A1 | * | 1/2003 | Sajadian ...................... | 40/564 |
| 2003/0071581 A1 | * | 4/2003 | Panagotacos et al. ... | 315/185 R |

FOREIGN PATENT DOCUMENTS

| | | | | |
|---|---|---|---|---|
| GB | 2044506 A | * | 10/1980 | |
| GB | 2216704 A | * | 10/1989 | ........... G09F/13/18 |
| JP | 405072981 A | * | 3/1993 | |
| JP | 406242731 A | * | 9/1994 | |

* cited by examiner

*Primary Examiner*—Thomas M. Sember
*Assistant Examiner*—Hargobind S. Sawhney
(74) *Attorney, Agent, or Firm*—Stephen Glazer

(57) ABSTRACT

A solid transparent acrylic letter comprising a light source and sign board with said letter having on all the entire edges surround with flexible material with said flexible material containing said light source with a reflective material on one side of said letter, said sign board attaches said letter with studs, and electrical wiring joins said solid transparent acrylic letters.

13 Claims, 7 Drawing Sheets

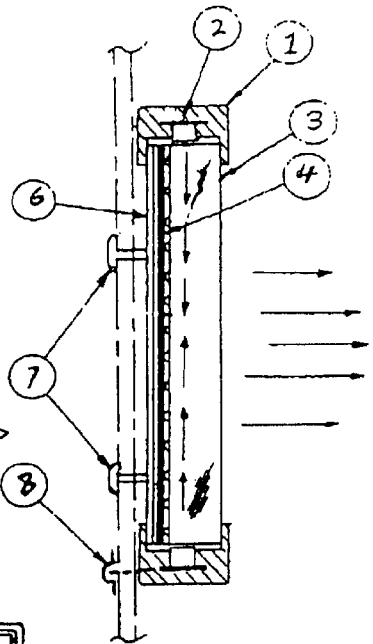
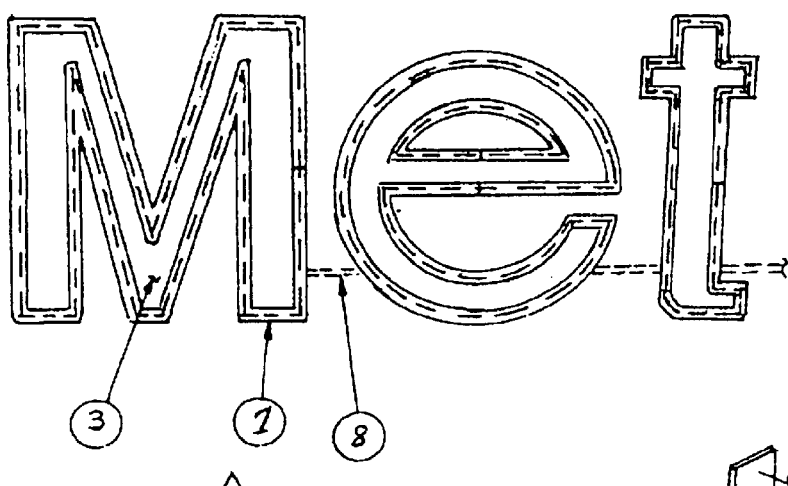
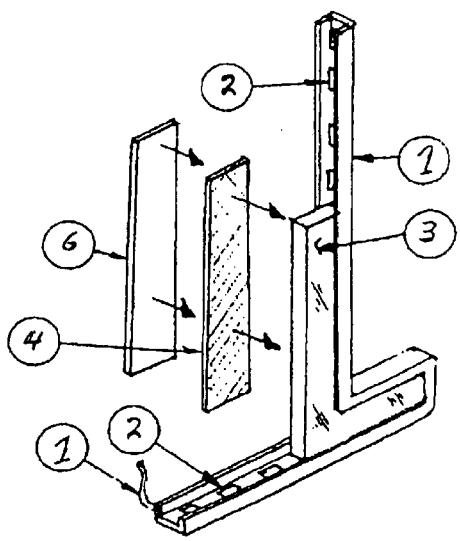

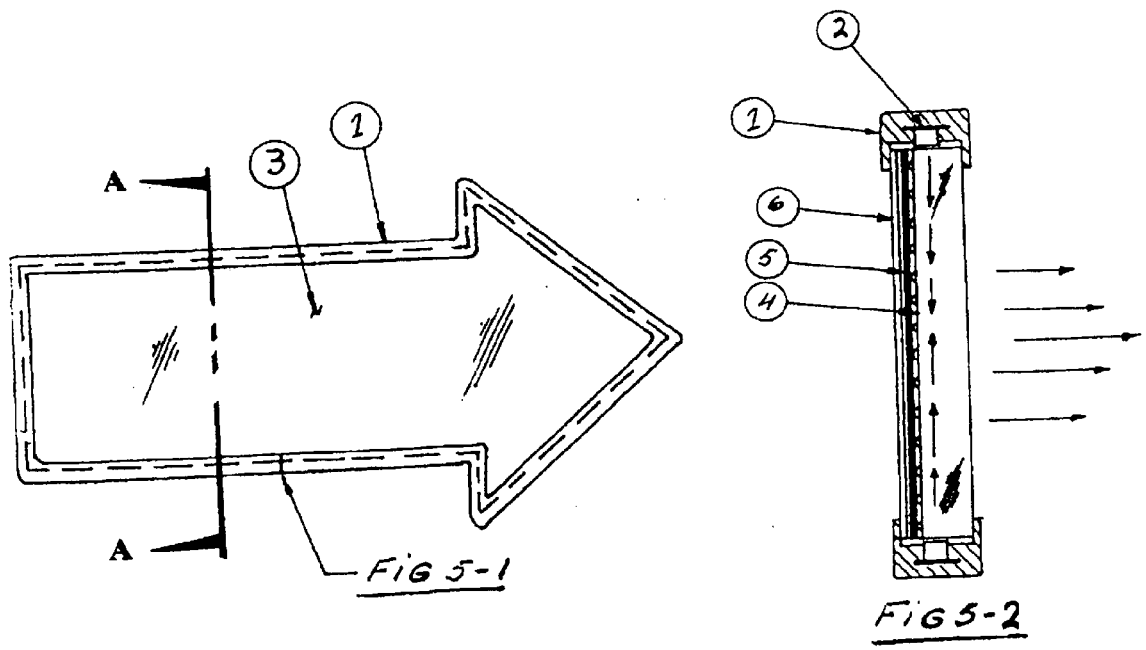

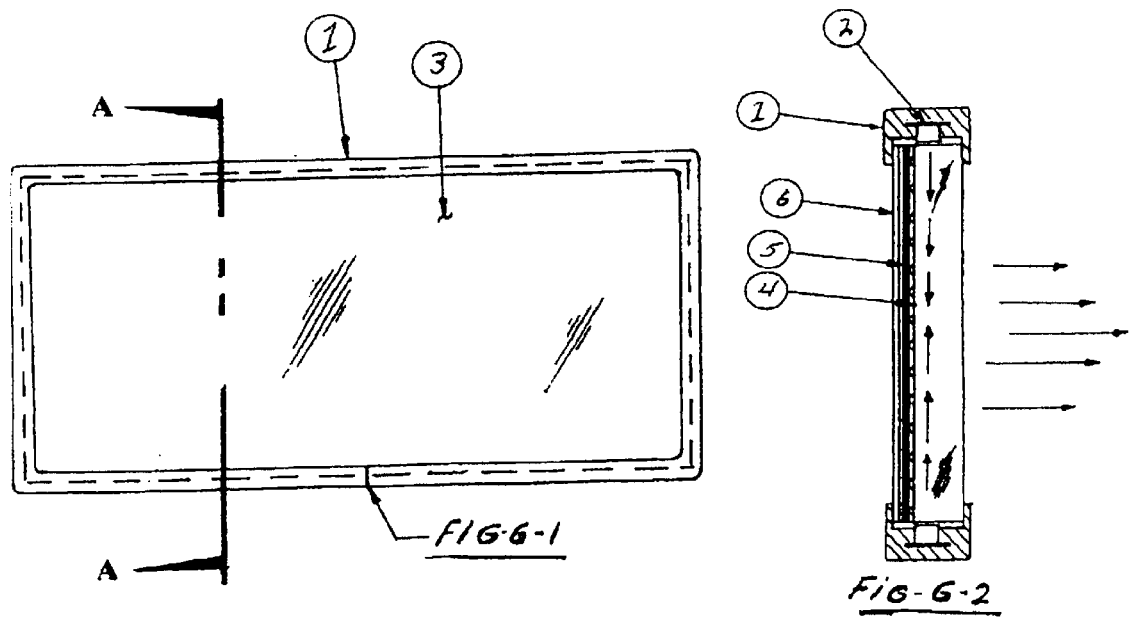

SOLID TRANSPARENT ACRYLIC LETTERS

CROSS REFERENCE TO RELATED APPLICATIONS

This application is claiming the benefit and filing date of the provisional application with the application No. 60/313,093 filed Aug. 18, 2001.

FEDERALLY SPONSORED RESEARCH

Not Applicable

SEQUENCE LISTING

Not Applicable

FIELD OF INVENTION

This invention relates to illuminated solid transparent acrylic letters.

BACKGROUND

Background.

In public places and buildings, numbers shapes and characters are used to advertise or display the name of a company or a product or service. Those characters are bulky, thick, and hollow. To illuminate those characters, fluorescent lamps are placed inside the letters. The light from the lamps is projected out and illuminates a translucent plastic in the shape of the letter. The installation of these letters is difficult, and significant construction and installation is required, since power has to be taken to a remote location. Also the illumination of the letters uses a lot of power, especially when large messages or names are displayed. The type of lamps used, also requires ongoing maintenance.

In Highways and streets guide signs are installed. These signs are large, supported by large structures. To make the signs visible at night, powerful lights are placed in front and projected towards the signs. The message displayed in the signs, are made of a reflective vinyl and glued to the signboard. The lighting required is intensive and consumes a lot of power. Installation is difficult since power has to be brought to remote locations.

SUMMARY

It is the object of this invention to provide for solid transparent acrylic letters that uses light emitting diodes as a source of light. The light from the light emitting diodes is projected through the edge of the letters, characters an shapes. This will eliminate the use of heavy thick letters illuminated from the back. These letters are light and easy to install, and will consume a fraction of the power currently used by the existing solid transparent acrylic letters, because they are efficiently illuminated from the edge of the letters. Since, the power used is low batteries and or solar power systems can be used. The batteries and solar systems will be attached next to the solid transparent acrylic letters.

DRAWINGS

Figures

FIG. 1-1 Represents a front view of a solid transparent acrylic letter.

FIG. 1-2 Represents a cut section of a solid transparent acrylic letter.

FIG. 2-1 Represents a front view of solid transparent acrylic letters linked together to form a name.

FIG. 2-2 Represents a cut section of a solid transparent acrylic letter, with the various components.

FIG. 2-3 Represents a sectional view of a solid transparent acrylic letter attached to a highway sign.

FIG. 2-4 Represents a front view of a highway sign with solid transparent acrylic letters attached to form a name.

FIG. 3-1 Represents an acrylic panel used for solid transparent acrylic letters.

FIG. 3-2 Represents a section of a prismatic pattern printed on one side of the acrylic panel.

FIG. 3-3 Represents a view of the acrylic panel, with a reflective material attached to the area that contains the printed prismatic pattern.

FIG. 3-4 Represents an acrylic panel with an alternative and more efficient system of reflection. One side of the panel is indented.

FIG. 3-5 Represents a double-sided panel with the indentation system of reflection.

FIG. 4-1 Represents a front view of a stop sign with edge lighting system.

FIG. 4-2 Represents a cut section view of a stop sign.

FIG. 5-1 Represents a front view of an arrow with edge lighting system.

FIG. 5-2 Represents a cut section view of an arrow.

FIG. 6-1 Represents a front view of a panel used for barricades, using the edge lighting system.

FIG. 6-2 Represents a cut section of a panel used for barricades.

Figures 1, 2:
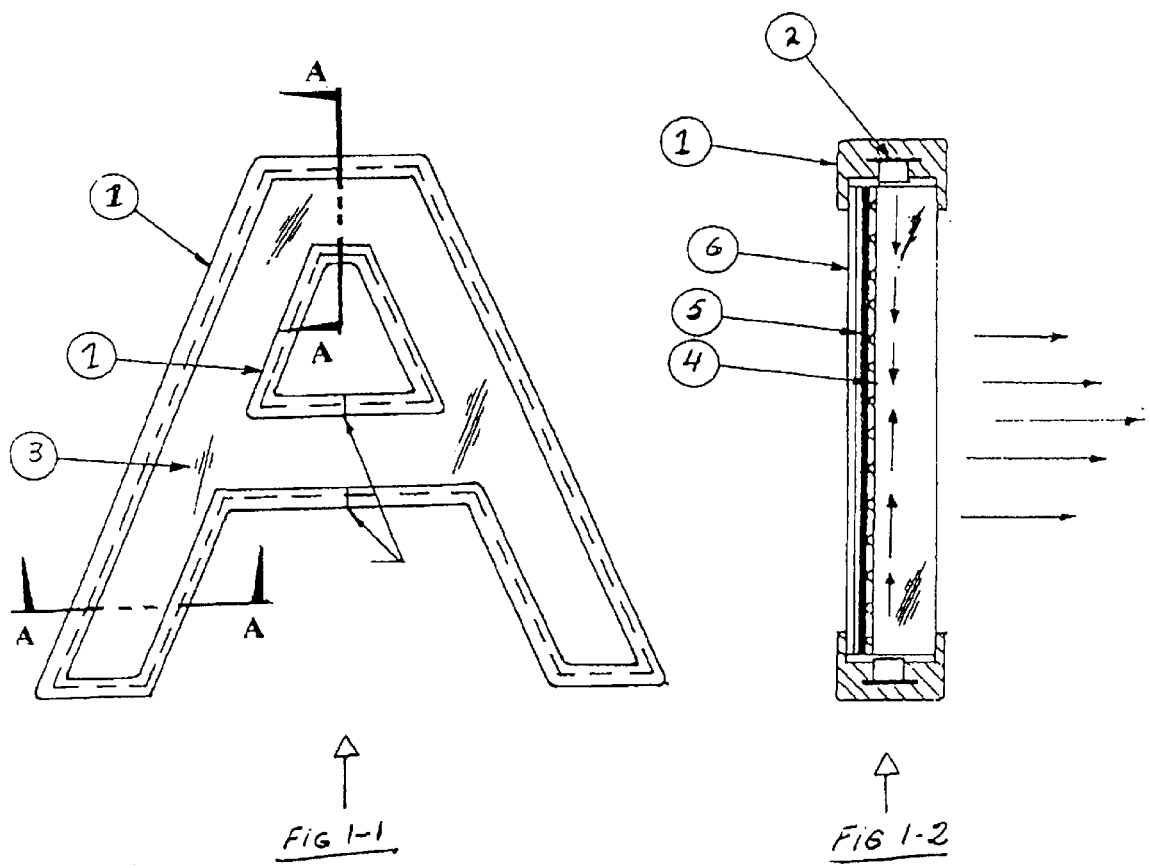

DRAWINGS--Reference Numerals 1. flexible channel
2. light emitting diodes
3. panel
4. reflective film
5. back panel
6. back support
7. studs
8. wiring
9. panel indentations
10. coating

DETAILED DESCRIPTION

A special extruded channel (1) made out of plastic or nonconducting material surrounds around the acrylic letter (3). The channel (1) contains light emitting diodes LED's (2). These light emitting diodes (2) projects light through the acrylic letter panel (3) and is reflected out, as shown in FIG. 1-2.

These light emitting diodes (2) are strategically placed inside the channel (1) as shown in FIG. 2-2. The light from the light emitting diodes (2) projects in various angles inside the acrylic letter and once the light hits the reflective film (4) it bounces outside of the panel. The letter has a back support (6) made out of plastic or metal, to add strength and permit the installation of letters to any surface.

Each letter is connected by electrical wiring (8) as shown in FIG. 2-1. Once all the letters and characters are connected, it will look like the sign in FIG. 2-4.

Figures 1, 3:
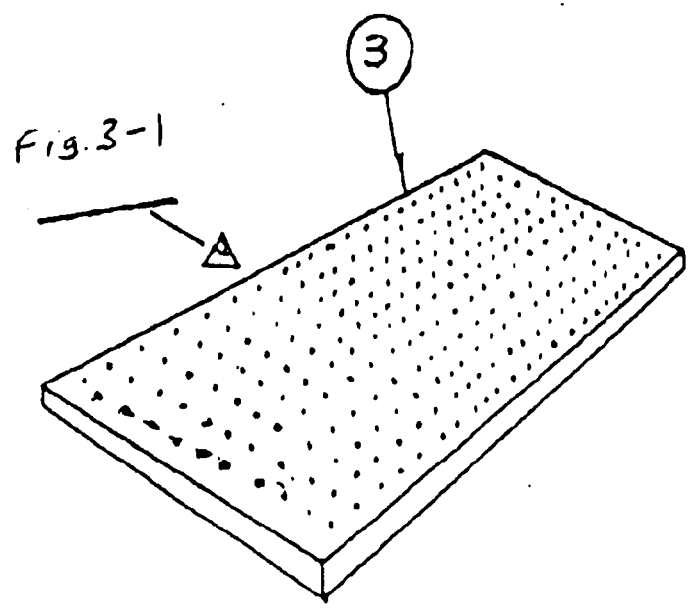
Figures 2, 3:
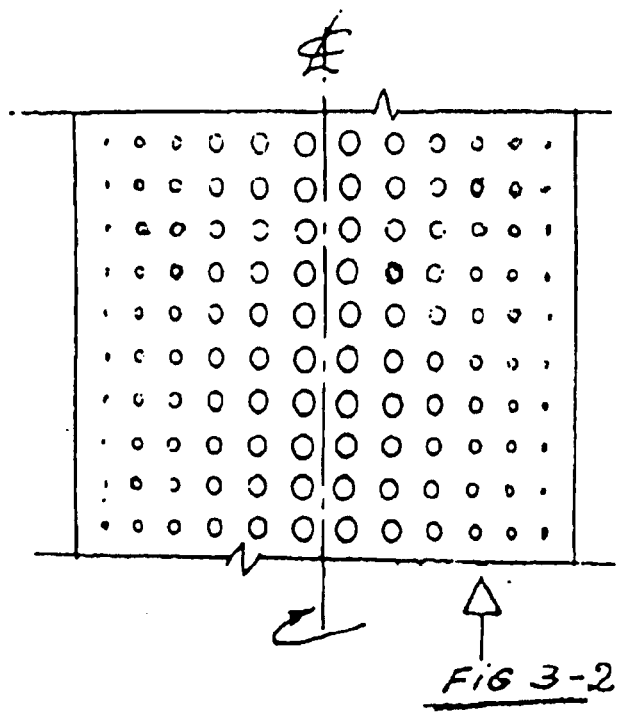
Figure 3:
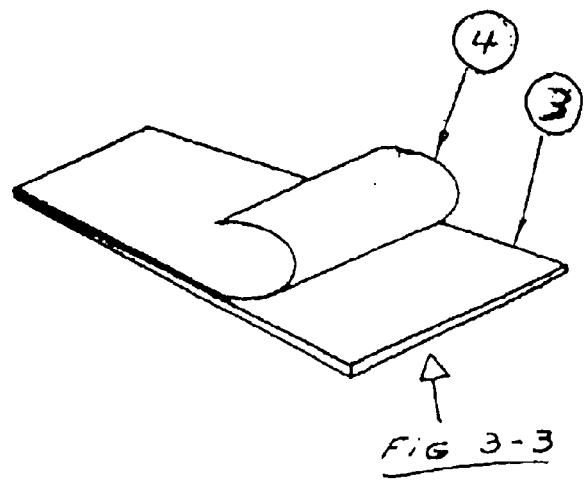

The solid transparent acrylic letters or characters are attached to the front of a sign as shown in FIG. 2-3. The back support (6) has threaded studs (7) attached to the back support (6). These threaded studs (7) are inserted through the sign and fastened with nuts.

The acrylic letter (3) has a prismatic pattern printed on the back as shown in FIG. 3-1 and the light that passes through the prismatic pattern area is reflected when it hits a reflective film (4). The reflective film (4) is positioned behind the printed area.

Figures 3, 4, 5:
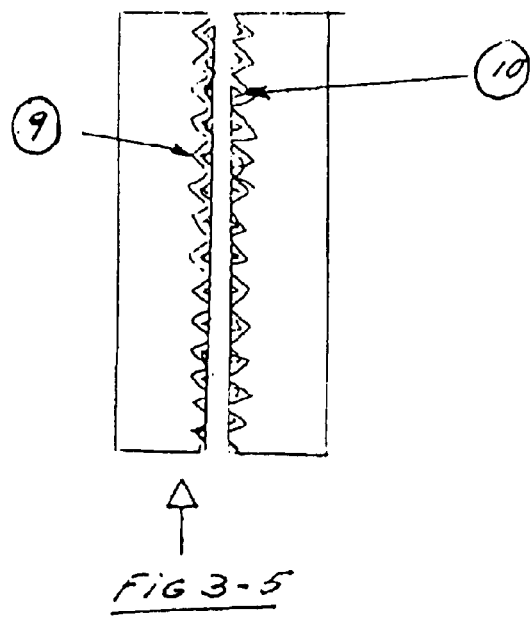
Figures 3, 4:
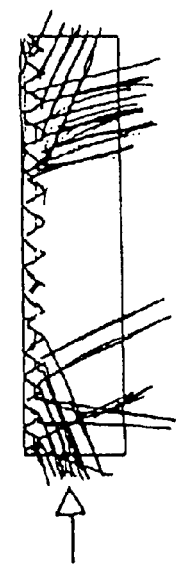
Figures 1, 4:
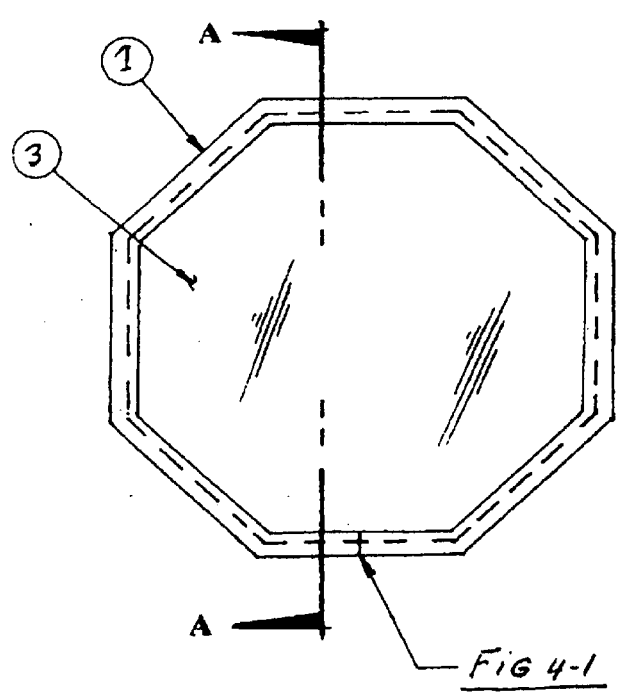
Figures 2, 4:
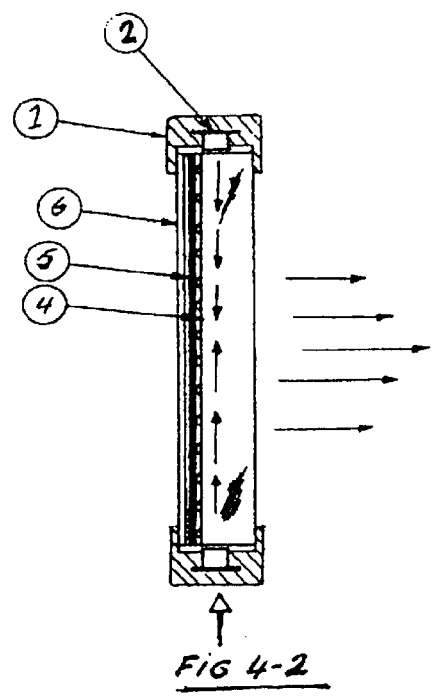

A more efficient system to reflect light can be used as shown in FIGS. 3-4 and 3-5. Using an acrylic panel with indentations on one side (9) and applying a special reflective paint to the indented side (10) we can increase the amount of light reflected. Using this solid transparent acrylic letter system of illumination we can also apply to the manufacture of other shapes, such as stop signs, directional arrows and panels for barricade systems, as shown in FIGS. 4-1, 4-2, 5-1, 5-2, 6-1, and 6-2.

What is claimed is:

1. An internally illuminated sign comprising at least one solid transparent acrylic letter, having a light source surrounding all its edges, and being supported on a sign board.

2. An internally illuminated sign according to claim 1 wherein said light source is at least one light emitting diode.

3. An internally illuminated sign according to claim 1 wherein said solid transparent acrylic letter is attached to said sign board.

4. An internally illuminated sign according to claim 3 wherein said sign board material is selected from one of the following: plastic; metal; or wood.

5. An internally illuminated sign according to claim 1 wherein said solid transparent acrylic letter contain threaded studs in the back of the said letter.

6. An internally illuminated sign according to claim 5 where said solid transparent acrylic letter is attached to said sign board or any other structure by said threaded studs in the back of said letter.

7. An internally illuminated sign according to claim 1 wherein said solid transparent acrylic letters is joined by at least one electrical wire.

8. An internally illuminated sign according to claim 1 wherein said at least one solid transparent acrylic letter further include a reflective coating on one back surface of said letter.

9. An internally illuminated sign according to claim 8 wherein said reflective coating is printed on said back surface of said letter.

10. An internally illuminated sign according to claim 8 wherein said at least one solid transparent acrylic letter further includes a plurality of indentations on the same side as the said reflective coating.

11. An internally illuminated sign according to claim 1 wherein said solid transparent acrylic letter edges are surrounded by flexible extruded channel.

12. An internally illuminated sign according to claim 11 wherein said flexible extruded channel comprises plastic or non-conductive flexible material.

13. An internally illuminated sign comprising:
- at least one solid transparent acrylic letter having at least one light emitting diode within itself;
- said letter including threaded studs positioned to attach said letter to a sign board or any other structure;
- a printed reflective coating on the back surface of said letter;
- a non-conductive flexible extruded material surrounding the entire outermost edges of said letter; and
- at least one electrical wire conjoins said letter.

* * * * *